Jan. 5, 1965  P. DUMAS ETAL  3,163,885
FISH SKINNING TOOL
Filed July 11, 1962
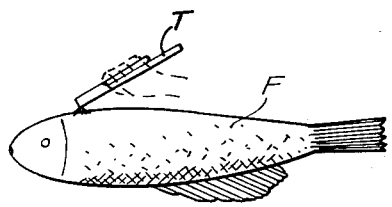
Fig. 2
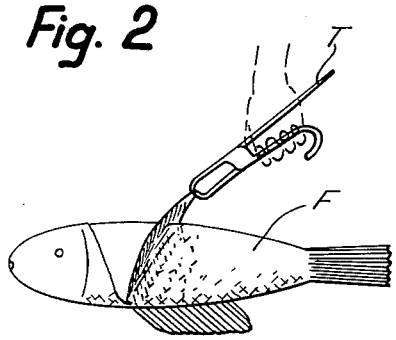
Fig. 3
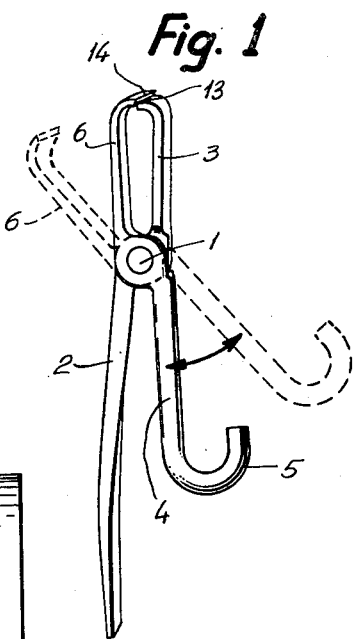
Fig. 1
Fig. 4
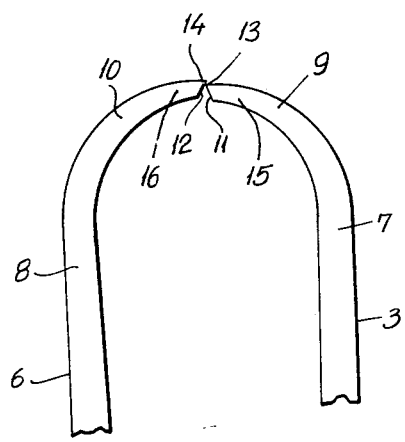
Fig. 5
INVENTORS
Philippe DUMAS
Vianney MARCOUX
BY
Pierre Lesperance
PATENT AGENT

3,163,885
FISH SKINNING TOOL
Philippe Dumas and Vianney Marcoux, both of 4468 Delorimier, Montreal, Quebec, Canada
Filed July 11, 1962, Ser. No. 209,093
Claims priority, application Canada, Aug. 22, 1961, 830,268, Patent 650,325
4 Claims. (Cl. 17—7)

The present invention relates to a type of tool especially adapted for the skinning of fish.

The skinning of fish is usually done by using a knife to a first slit the skin at the point where the skinning operation is to be initiated. Generally, this is adjacent a point where the head joins the body. The operator then seeks to free enough of the skin with the knife in order to get a hold either for the finger or for the insertion of a jaw of a pair of pliers. Once a firm grip is achieved with the pliers, the skin is pulled upwardly and rearwardly from the body to free the skin from the flesh. Ordinary pliers especially when skinning certain kinds of fish the skin of which is slippery and/or adheres firmly to the flesh, frequently slip off the skin and the skinning operation is difficult to make and is time consuming. Moreover, as noted above, at least a knife and a pair of pliers are required and must be wielded separately for skinning a fish.

The general object of the present invention resides therefore in the provision of a new fish skinning tool which will obviate the above noted disadvantages and considerably facilitate the skinning of fish.

A more specific object of the present invention resides in the provision of a tool of the character described in the general form of pliers but with specially designed jaws which will have a firm grip on the skin even when the latter is very slippery and adheres firmly to the flesh of the fish.

Another very important object of the present invention resides in the provision of a tool of the character described which is used both for initially slitting the skin and for gripping the skin and pulling it away from the fish body, whereby the whole skinning operation can be effected very quickly and without change of tool.

Yet another object of the present invention resides in the provision of a fish skinning tool of the character described which is of very simple and inexpensive construction.

The foregoing and other important objects of the present invention will become more apparent during the following disclosure and by referring to the drawings, in which:

FIGURE 1 is a perspective view of the tool of the present invention;

FIGURE 2 is a schematic side elevation of a fish and of the tool in the position used for making a slit in the skin just behind the fish head;

FIGURE 3 is a similar schematic elevation showing the skin in the process of being pulled away from the fish body by the tool of the invention;

FIGURE 4 is an end elevation of the tool on an enlarged scale; and

FIGURE 5 is a partial elevational side view on a further enlarged scale of the closed mating jaws.

Referring now more particularly to the drawings in which like reference characters indicate like elements throughout, the fish skinning tool of the invention comprises a pair of elongated members arranged in crossed relationship and pivotally interconnected intermediate their ends by a hinge pin 1 at their crossed portion and each defining a hand grip and a jaw member; more specifically, one of the members defines a straight hand grip 2 and an integral jaw 3 while the other member defines a hand grip 4 having an outwardly curved U-shaped outer end 5 and a jaw 6 integral with hand grip 4.

The curved hand grip 4 is shorter than the straight hand grip 2 and its U-shaped outer end is adapted to receive the small finger of the operator's hand, while the straight hand grip 2 is adapted to locate within the bottom of the hand. The jaws 3 and 6 are made of flat stock gradually tapering towards their outer ends. Each jaw comprises straight portions 7 and 8 respectively which are substantially parallel to each other in the closed position of the tool, and which are extended by curved portions 9 and 10 respectively which are inwardly directed towards each other and which are terminated by bevelled and flat end faces 11 and 12 respectively defining sharp outer cutting edges 13 and 14 respectively. The cutting edge 13 is slightly offset inwardly of the cutting edge 14 and abuts the end face 12 in the closed position of the tool, as clearly shown in FIGURE 5. The jaws 3 and 6 pivot in a common plane towards and away from each other and they have a substantial width, as shown in FIGURE 4, for example about ½ inch. The jaws in opened position make an angle of approximately 60 to 70° as shown in FIGURE 1. The cutting edges 13 and 14 meet the side faces 15 and 16 respectively of the jaws 3 and 6 at substantially right angles so as to define sharp corners at the ends of the cutting edges.

The tool of the invention is used as follows: The fish to be skinned is grasped with one hand or may be inserted in a holder and the tool is grasped with the other hand and is applied to the skin just behind the head of the fish with the jaw ends partially open and extending towards each other in a plane at right angles to the length of the fish so as to bring the ends of the cutting edges 13 and 14 in engagement with the skin, the jaws 3 and 6 are then pressed together to effect a slit in the skin. This is facilitated due to the fact that the back of the fish is usually rounded. The slit is easily made due to the biting action of the overlapping cutting edges 13 and 14 in the closed position of the jaws.

The tool is thereafter rotated 90° and the cut skin along the rear edge of the slit is gripped by the full length of the cutting edges of the jaws. The skin is gripped between the bevelled end face 12 of jaw 6 and the cutting edge 13 of jaw 3. A very secure grip is obtained and the skin can be pulled away from the fish body as shown in FIGURE 3 without slipping of the skin through the gripping jaws and yet without cutting or puncturing the skin. The pulling operation is facilitated because the curved outer end 5 of hand grip 4 engages the fingers of the operator's hand and prevents slipping of the hand off the tool hand grips.

From the foregoing, it is apparent that both the slitting and skinning operations are effected with the same tool and with just one 90° rotation of the tool while being held by the same hand. Thus, skinning of a fish is quickly effected with the tool of the present invention.

While a preferred embodiment in aaccordance with the present invention has been illustrated and described, it is understood that various modifications may be resorted to without departing from the spirit and scope of the appended claims.

What we claim is:

1. A fish skinning tool comprising a pair of elongated members pivotally interconnected intermediate their ends and defining hand grips at one end portion and jaw members at their opposite end portions, said jaw members coacting and pivoting in a common plane, said jaw members being substantially symmetrical and each comprising a substantially straight portion and an inwardly curved outer end portion, said curved end portions directed towards each other and each terminated by a bevelled flat end face defining an outer transversely extending cutting edge, the cutting edge of one jaw being offset relative to the cutting edge of the other jaw and abutting against the bevelled end face of the opposite jaw in the closed position of said jaws, said bevelled end faces being substantially equally inclined relative to the long axis of said tool, on each side of said axis, in the closed position of said jaws.

2. A fish skinning tool as claimed in claim 1, wherein one of said hand grips is straight and the other of said hand grips is shorter than the first hand grip and is curved outwardly into a U-shape at its outer end to form a finger abutment.

3. A fish skinning tool as claimed in claim 1, wherein the ends of said cutting edges form sharp corners with the adjacent side faces of the associated jaws for slitting the skin of a fish.

4. A fish skinning tool as claimed in claim 1, wherein said jaws have a substantially uniform width but a progressively decreasing thickness towards their outer ends.

References Cited by the Examiner
UNITED STATES PATENTS

| | | | |
|---|---|---|---|
| 1,171,241 | 2/16 | Potter | 17—7 |
| 1,459,007 | 6/23 | Wetzig | 17—7 |
| 2,030,463 | 2/36 | Nelms | 17—7 |
| 2,810,154 | 10/57 | Wiesenhofer | 17—7 |

SAMUEL KOREN, *Primary Examiner.*

LUCIE H. LAUDENSLAGER, *Examiner.*